United States Patent
Lee et al.

(10) Patent No.: US 7,524,368 B2
(45) Date of Patent: Apr. 28, 2009

(54) BLACK DYE COMPOSITION AND BLACK INK COMPOSITION FOR TEXTILE DIGITAL PRINTING

(75) Inventors: Chuan-Hsi Lee, Taoyuan Hsien (TW); Tzu-Kwei Sun, Taoyuan Hsien (TW); Reng-Fang Lin, Taoyuan Hsien (TW); Hsiao-San Chen, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 11/898,092

(22) Filed: Sep. 10, 2007

(65) Prior Publication Data
US 2008/0184912 A1 Aug. 7, 2008

(30) Foreign Application Priority Data
Feb. 1, 2007 (CN) .................. 2007 1 0002807

(51) Int. Cl.
*C09D 11/00* (2006.01)
*C09B 62/453* (2006.01)
(52) U.S. Cl. .............. 106/31.52; 106/31.48; 106/31.59; 8/549
(58) Field of Classification Search .............. 106/31.48, 106/31.52, 31.51, 31.59; 8/549
See application file for complete search history.

(56) References Cited
U.S. PATENT DOCUMENTS
4,694,302 A  9/1987  Hackleman et al. .......... 346/1.1

(Continued)

*Primary Examiner*—Helene Klemanski
(74) *Attorney, Agent, or Firm*—Bacon & Thomas, PLLC

(57) ABSTRACT

The present invention relates to a black dye composition, comprising: (a) at least one azo dye of the following formula (I),

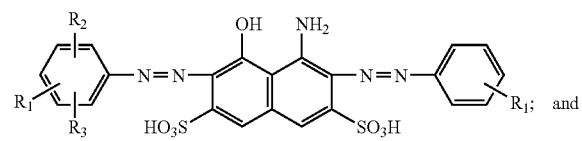

(b) at least one azo dye of the following formula (II) or (III),

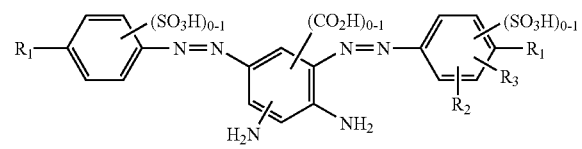

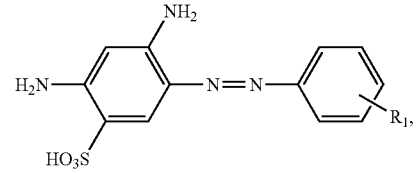

wherein $R_1$, $R_2$, and $R_3$ are defined the same as the specification. The present invention also relates to a black ink composition afforded from the aforementioned black dye composition. The black ink composition of the present invention for textile digital printing exhibits the properties of excellent color depth, fixation, stability of storage, stability and accuracy of printing for long time, and improves the issue of nozzle cloggage.

15 Claims, 1 Drawing Sheet

Wavelength (nm)

U.S. PATENT DOCUMENTS

| | | | |
|---|---|---|---|
| 5,062,892 A | 11/1991 | Halko | 106/22 |
| 5,611,821 A | 3/1997 | Huang et al. | 8/549 |
| 5,690,698 A * | 11/1997 | Von Der Eltz et al. | 8/549 |
| 5,725,641 A | 3/1998 | MacLeod | 106/31.5 |
| 5,849,887 A * | 12/1998 | Lehmann et al. | 8/549 |
| 5,931,974 A * | 8/1999 | Pedemonte | 8/549 |
| 6,086,639 A * | 7/2000 | Steckelberg et al. | 8/549 |
| 6,126,700 A | 10/2000 | Bao-Kun et al. | 8/549 |
| 6,319,291 B1 * | 11/2001 | Pedemonte | 8/549 |
| 6,443,997 B1 * | 9/2002 | Oh et al. | 8/549 |
| 6,870,035 B2 * | 3/2005 | Pedemonte et al. | 534/634 |
| 7,288,142 B2 * | 10/2007 | Lin et al. | 106/31.51 |
| 7,387,667 B1 * | 6/2008 | Lin et al. | 106/31.48 |
| 2007/0050926 A1 * | 3/2007 | Lin et al. | 8/568 |

* cited by examiner

BLACK DYE COMPOSITION AND BLACK INK COMPOSITION FOR TEXTILE DIGITAL PRINTING

BACKGROUND OF THE INVENTION

1. Field of the Invention

The present invention relates to a black dye composition and a black ink composition and, more particularly, to a black dye composition and a black ink composition used for textile digital printing and suitable for ink-jet printing on cellulose fiber materials.

2. Description of Related Art

Ink-jet printing has been applied in the textile industry for many years. The method of ink-jet printing can omit the manufacture of a screen to save the cost and time. More particularly, the required variation can be realized in a shorter time when designing various patterns.

In the view of application, the best properties of an ink composition are required for ink-jet printing, such as viscosity, stability, surface tension, and flow ability. In addition, resulting printed fabric has to exhibit better properties, such as color yield, fixation, stability of association between fibers and dyes, moisture fastness and so on.

An ink composition used for ink-jet printing comprises a dye that can dissolve or disperse in water or a liquid medium containing a water-soluble organic solvent. In addition, a surfactant can also be added into the ink composition to change the properties of the ink composition to meet with the requirement for textile ink-jet printing.

U.S. Pat. No. 6,015,454 discloses an ink composition comprising at least one reactive dye, and 1,2-propylene glycol or N-methyl-2-pyrrolidone. The ink composition disclosed by U.S. Pat. No. 6,015,454 improves the color depth and fastness properties of ink-jet printed fabric. However, the stability properties of storage and printing for long time are poor, and nozzle cloggage occurs at the same time.

U.S. Application No. 2003/0172840 discloses an ink composition comprising at least one reactive dye, sulfolane, and a buffer system. The ink composition disclosed by U.S. Application No. 2003/0172840 improves the stability of storage and nozzle cloggage. However, chlorine-resistant fastness, color depth, and solubility of dyes need to be improved.

Thereby, it is an important issue to provide a black dye composition used for the manufacture of a black ink composition for textile digital ink-jet printing, which exhibits the properties (such as improved light-fastness, chlorine-resistant fastness, color depth, solubility of dyes and so on).

SUMMARY OF THE INVENTION

The present invention provides a black dye composition and a black ink composition for textile digital ink-jet printing, which exhibits many improved properties for printing cellulose fibers and cellulosic blended fibers.

The black dye composition of the present invention comprises:

(a) at least one azo dye of the following formula (I),

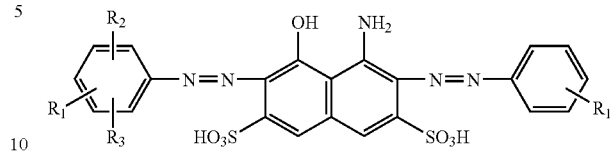

(I)

wherein $R_1$ is $-SO_2CH_2CH_2OSO_3H$, $-SO_2CH=CH_2$, or

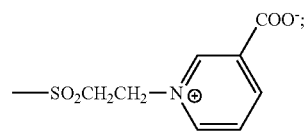

$R_2$ and $R_3$ each independently is $-CH_3$, $-OCH_3$, or H; and (b) at least one azo dye of the following formula (II) or (III),

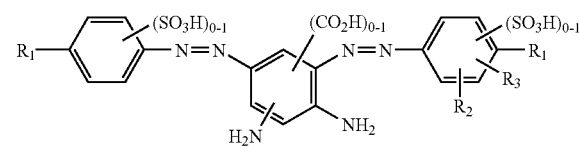

(II)

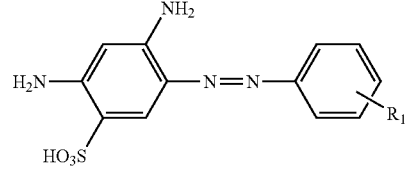

(III)

wherein $R_1$, $R_2$, and $R_3$ are defined as above.

The black dye composition of the present invention can further comprise:

(c) at least one azo dye of the following formula (IV) or (V),

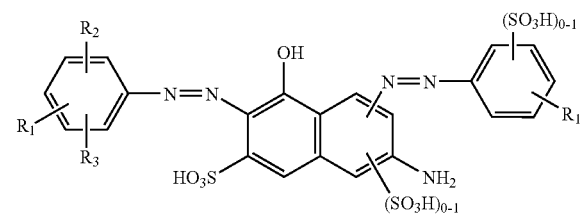

(IV)

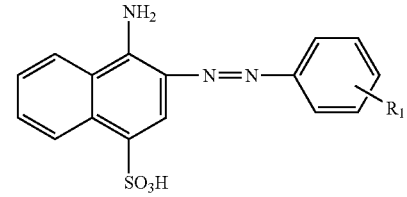

(V)

wherein $R_1$, $R_2$, and $R_3$ are defined as above.

Examples of the azo dye of the formula (I) are

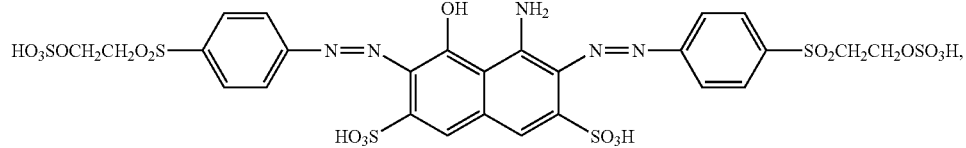
(I-1)
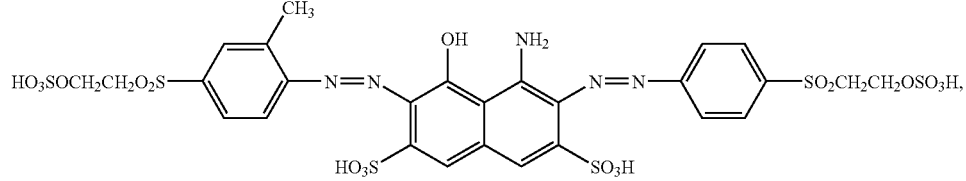
(I-2)
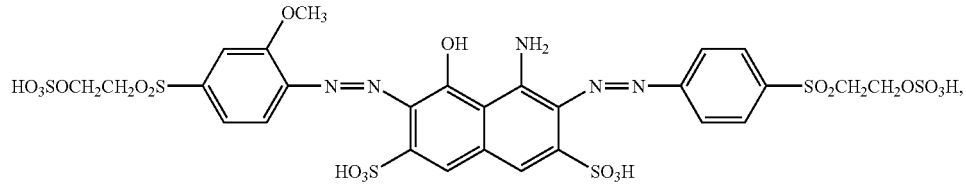
(I-3)
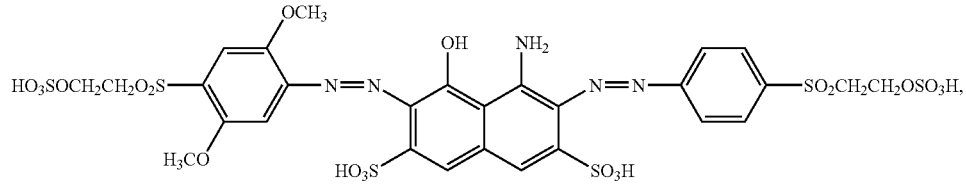
(I-4)
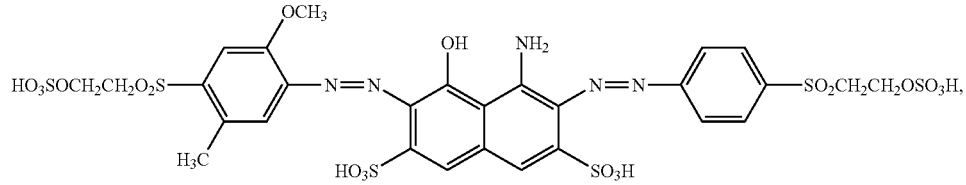
(I-5) and
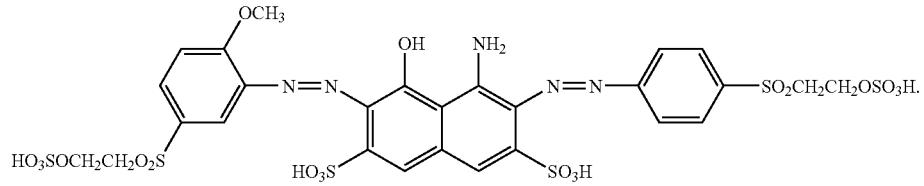
(I-6)
Preferably, the azo dye of the formula (II) is the following formula (II-A) or (II-B).
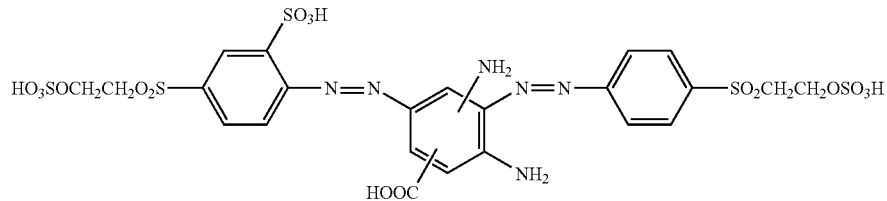
(II-A)

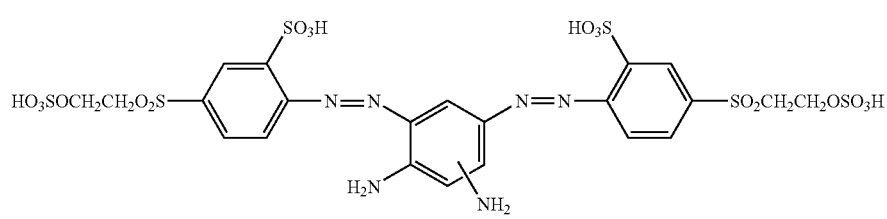
Examples of the azo dye of the formula (II) are
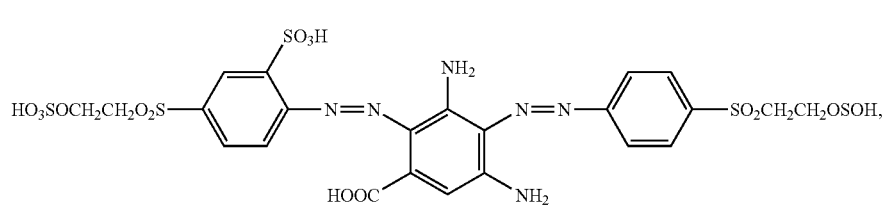
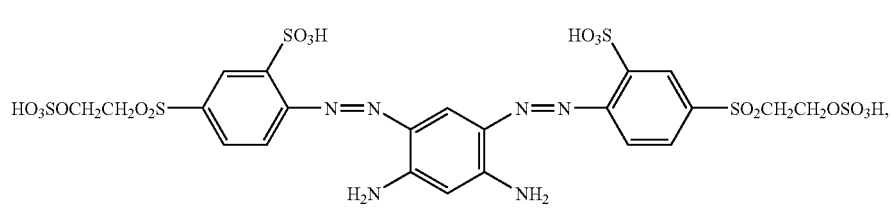
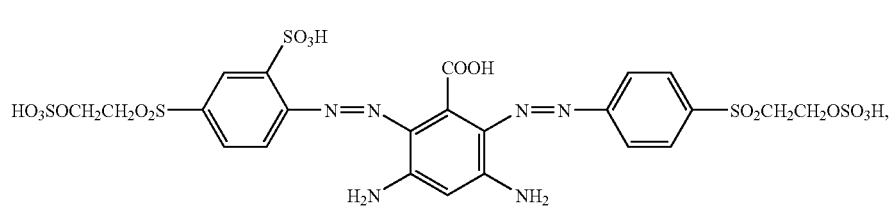
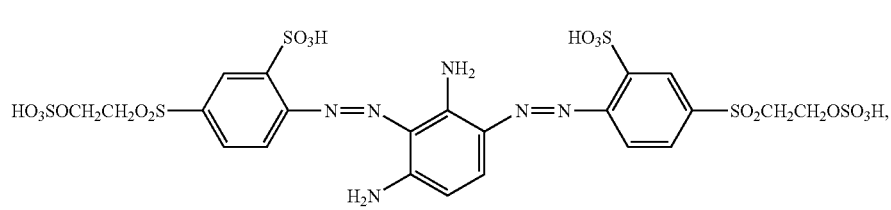
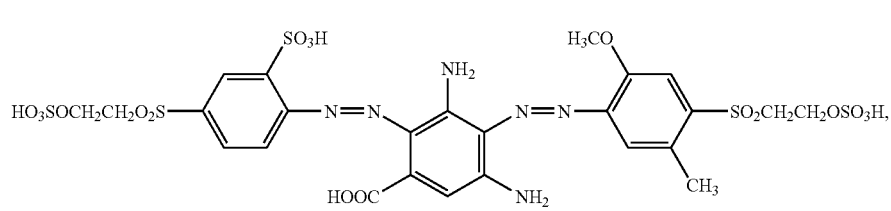
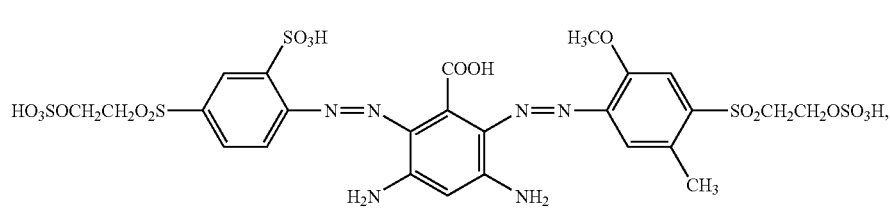

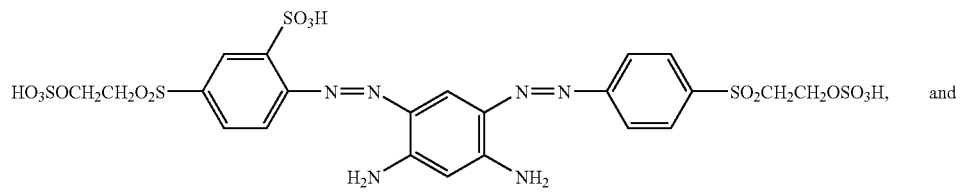
(II-7)
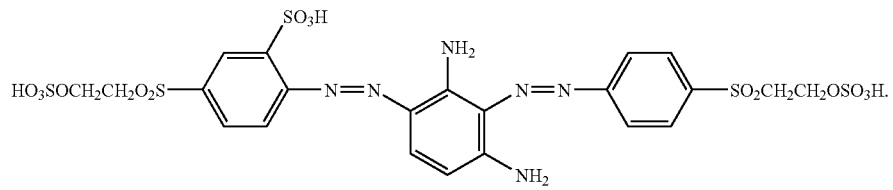
(II-8)
Preferably, the azo dye of the formula (III) is the following formula (III-1).
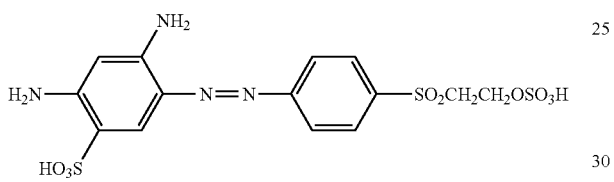
(III-1)
Examples of the azo dye of the formula (IV) are
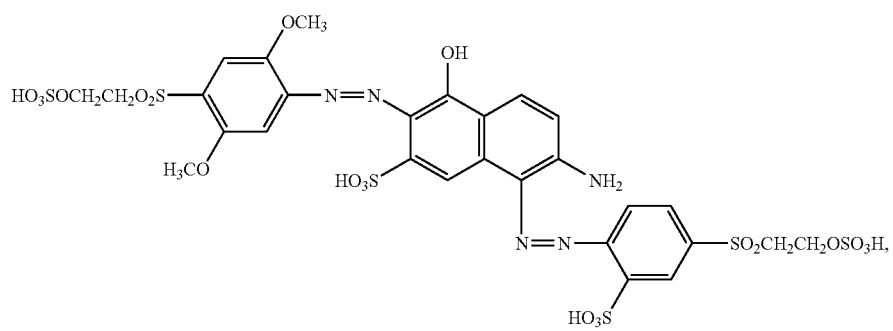
(IV-1)
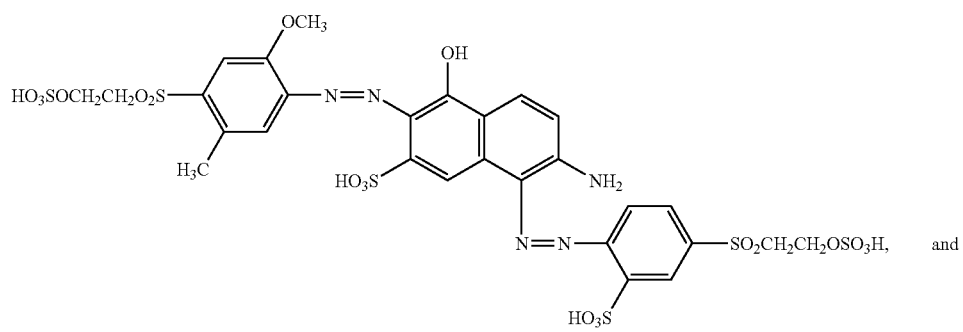
(IV-2) and -continued

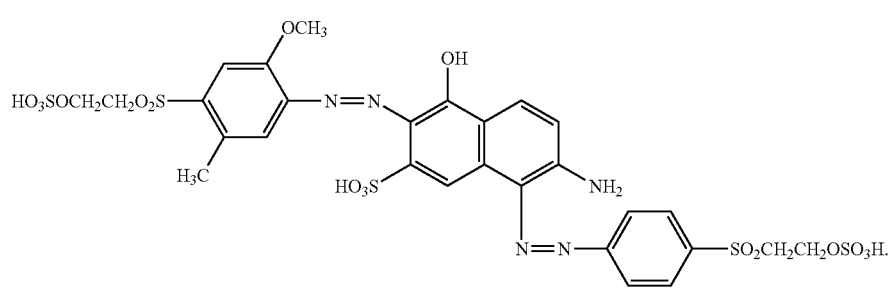
(IV-3)

Preferably, the azo dye of the formula (V) is the following formula (V-1).

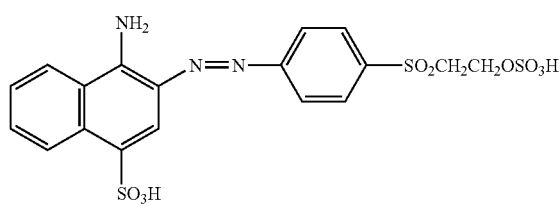
(V-1)

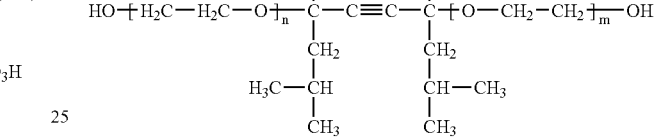
(VI)

wherein the sum of n and m is integer between 0 and 50. Preferably, the sum of n and m is integer between 0 and 20 and the content of the surfactant is 0.1~3% by weight.

If necessary, other additives (such as microbicide or antifoam agent) can be added to the black ink composition of the present invention. Preferably, the additive are, for example, NUOSEPT ( sold by Nudex Inc., a division of Huls Americal), UCARCIDE (sold by Union Carbide), VANCIDE (sold by RT Vanderbikt Co.), and PROXEL XL2 (sold by ICI Americas). For the black ink composition, the content of the additives is 0.01~1% by weight. For example, the black ink composition of the present invention used for textile digital ink-jet printing can further comprise component (D): microbicide. Preferably, the content of the microbicide is 0.01~1% by weight.

Accordingly, the black ink component of the present invention exhibits the properties of excellent color depth, fixation, stability of storage, stability and accuracy of printing for long time, and improves the issue of nozzle cloggage.

The dyes of the present invention are represented in the form of free acid. However, in practice, they often exist as metallic salts or ammonium salts, and most likely alkaline metallic salts or ammonium salts.

The component ratio of the black dye composition of the present invention is not especially limited. If the black dye composition comprises component (a) and component (b), preferably, the content of component (a) is 50~97% by weight, and the content of component (b) is 50~3% by weight.

If the black dye composition comprises component (a), component (b), and component (c), preferably, the content of component (a) is 50~94% by weight, the content of component (b) is 47~3% by weight, and the content of component (c) is 3~30% by weight.

The black dye composition of the present invention can be further used for the manufacture of a black ink composition.

The black ink composition of the present invention comprises:

(A) 5~35% by weight of the aforementioned black dye composition, which can comprise the component (a) and component (b) or comprise the component (a), component (b), and component (c); and (B) 5~30% by weight of organic solvent selected from the group consisting of ethylene glycol, 1,3-butanediol, 2-methyl-2,4-pentanediol, 1,2-propanediol, 2-pyrrolidone, and N-methyl-2-pyrrolidone; and 90~35% by weight of water.

The black ink composition of the present invention used for textile digital ink-jet printing can further comprise component (C):

(C) 0.1~5% by weight of a surfactant of the following formula (VI), such as Surfynol 465, Surfynol 485, Surfynol 420, and Surfynol 104 (sold by Air Products & Chemicals),

DETAILED DESCRIPTION OF THE PREFERRED EMBODIMENT

Figure 1:
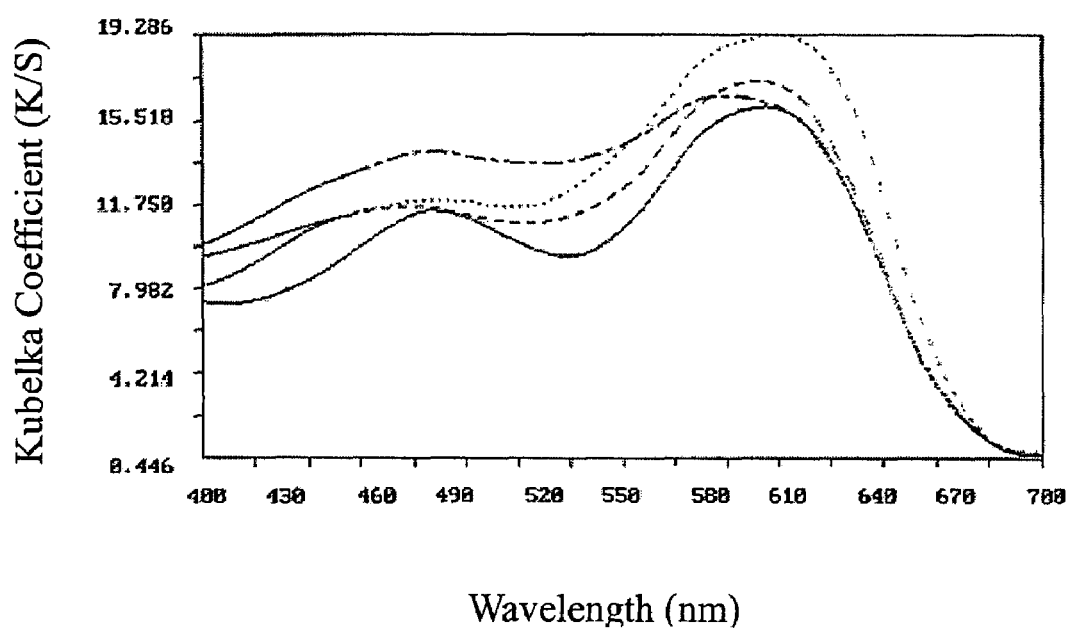
FIG. 1 shows the K/S curves of the black ink compositions of Examples 15, 23, 24, and Comparative Example 1, wherein "———" is the K/S curve of the black ink compositions of Example 15, "———" is the K/S curve of the black ink compositions of Example 24, "- - -" is the K/S curve of the black ink compositions of Example 23, and ". . ." is the K/S curve of the black ink compositions of Comparative Example 1.

The dye compound of the formula (IV) can be synthesized by the following synthetic steps.

1-aminobenzene-2-sulfonic acid-4-β-sulfatoethylsulfone is dissolved in ice acid-water, followed by the rapid addition of sodium nitrite to perform diazotization. Subsequently, 2-amono-5-hydroxynaphthalene-7-sulfonic acid is added to the reaction solution to perform coupling reaction.

Then, 1-aminobenze-2,5-dimethoxy-4-β-sulfatoethylsulfone is dissolved in ice acid-water, followed by the addition of sodium nitrite to perform diazotization. Subsequently, the compound afforded by the aforementioned coupling reaction is added to the reaction solution, the pH value of the reaction solution is adjusted to 5~6, and the coupling reaction is performed in the temperature range of 10° C. to 15° C. to afford the compound of the formula (IV-1).

The black dye compound of the formula (II) can be synthesized by the following synthetic steps.

1-aminobenzene-2-sulfonic acid-4-β-sulfatoethylsulfone is dissolved in ice acid-water, followed by the rapid addition of sodium nitrite to perform diazotization. Subsequently, 3,5-diaminobenzoic acid powders are added to the reaction solution to perform coupling reaction.

Then, 1-aminobenze-4-β-sulfatoethylsulfone is dissolved in ice acid-water, followed by the addition of sodium nitrite to perform diazotization. Subsequently, the compound afforded by the aforementioned coupling reaction is added to the reaction solution, the pH value of the reaction solution is adjusted to 3.5~5.0, and the coupling reaction is performed in the temperature range of 5° C. to 15° C. to afford the compound of the formula (II-1).

The preparation of the compounds of the formula (I), (III), and (V) is described in Taiwan Patent No. TW 323299, and Japanese Patent laid-open No. 45-40182.

The water-soluble reactive dyes in the black ink composition of the present invention can be the aforementioned dyes or the alkali metal salts thereof used alone or in a mixture. Preferably, the salt amount existing in the reactive dyes should be low. It means that with respect to the total weight of the reactive dyes of the present invention, the total salt amount existing in the reactive dyes is less than 0.5% by weight. The reactive dyes with the high amount of salts afforded from the preparation and/or the following addition of diluents can be proceeded with the procedure of salt exclusion, such as thin-film process (e.g. super filtration, reverse osmosis, or osmosis).

With respect to the total weight of the black ink composition of the present invention, the black ink composition of the present invention comprises 5~35% by weight of reactive dyes, 35~90% by weight of water, and 5~30% by weight of organic solvent.

Preferably, the black ink composition of the present invention comprises 10~30% by weight of reactive dyes, 40~85% by weight of water, and 5~30% by weight of organic solvent.

The content of an organic solvent in the black ink composition relates to the wet-keeping property of nozzles, the stability of printing and storage. The content of the organic solvent is 5~30% by weight. Preferably, the content of the organic solvent is 10~20% by weight.

The black ink composition of the present invention can be prepared by the conventional method, mixing all components in water of required amount.

The black ink compositions of the present invention can dye cellulose fiber materials. Examples of cellulose fiber materials are natural cellulose fibers (such as cotton, linen, and hemp) and regenerated cellulose fibers. The black ink composition of the present invention is also suitable for dyeing or printing fibers, which contain hydroxyl groups and are contained in blended fabrics.

The black ink composition of the present invention can be fixed on the fiber materials by digital ink-jet printing and, more particularly, by piezoelectric digital ink-jet printing.

The black ink component of the present invention exhibits the properties of excellent color depth, fixation, stability of storage, stability and accuracy of printing for long time, and improves the issue of nozzle cloggage.

According to the black ink composition of the present invention, the resulting printed fabric exhibits the excellent properties, such as stable binding between fibers and dyes in the acid or basic condition, excellent light fastness, wet fastness (e.g. wash fastness, water fastness, seawater fastness, cross-dyeing fastness, and moisture fastness), chlorine-resistant fastness, pleating fastness, ironing fastness, and rubbing fastness, as well distinct outline and excellent color depth.

The examples sited below should not be taken as a limit to the scope of the invention. Wherein the compounds are represented in the form of free acid. However, in practice, they often exist as metallic salts or ammonium salts, and most likely alkaline metallic salts or ammonium salts. Unless otherwise stated, the parts and percent used in the following examples are based on weight, and the temperature is in degree Celsius (° C.).

PREPARATION EXAMPLE 1

36.1 parts of 1-aminobenzene-2-sulfonic acid-4-β-sulfatoethylsulfone is dissolved in 1000 parts of ice water, followed by the addition of 24 parts of 32% HCl aqueous solution and then 7.0 parts of sodium nitrite aqueous solution to perform diazotization in the temperature range of 0° C. to 5° C. Subsequently, 23.9 parts of 2-amino-5-hydroxy-naphthalene-7-sulfonic acid is added to the reaction solution to perform coupling reaction. Finally, the compound of the following formula (1) is afforded by NaCl salting-out and then filtration.

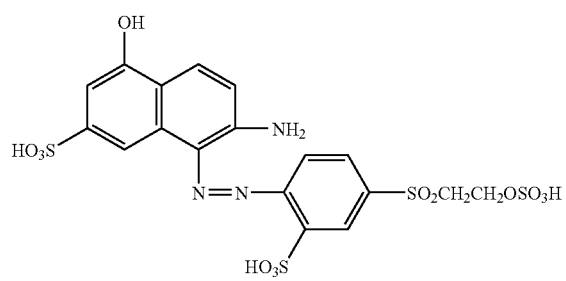

(1)

34.1 parts of 1-aminobenze-2,5-dimethoxy-4-β-sulfatoethylsulfone is dissolved in 1000 parts of ice water, followed by the addition of 24 parts of 32% HCl aqueous solution and then 7.0 parts of sodium nitrite to perform diazotization in the temperature range of 0° C. to 5° C. Subsequently, the compound (1) afforded by the aforementioned coupling reaction is added therein, the pH value of the reaction solution is adjusted to 5~6 by sodium carbonate, and the coupling reaction is performed in the temperature range of 10° C. to 15° C. Finally, the compound of the following formula (IV-1) is afforded by NaCl salting-out and then filtration.

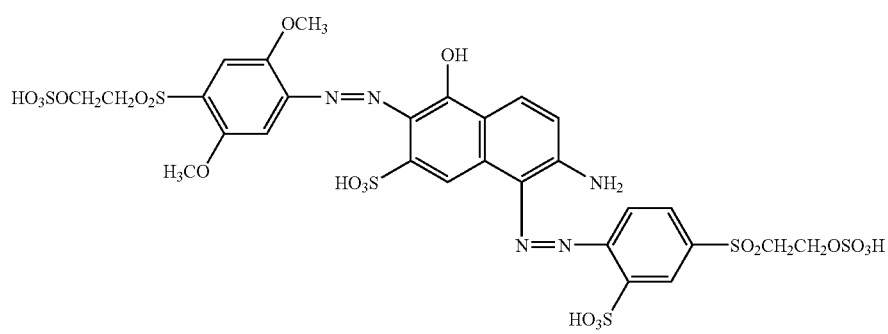

(IV-1)

PREPARATION EXAMPLE 2

32.5 parts of 1-aminobenzene-2-methoxy-5-methyl-4-β-sulfatoethylsulfone is dissolved in 1000 parts of ice water, followed by the addition of 24 parts of 32% HCl aqueous solution and then 7.0 parts of sodium nitrite aqueous solution to perform diazotization in the temperature range of 0° C. to 5° C. Subsequently, the compound (1) afforded by the aforementioned coupling reaction is added therein, the pH value of the reaction solution is adjusted to 5~6 by sodium carbonate, and the coupling reaction is performed in the temperature range of 10° C. to 15° C. Finally, the compound of the following formula (IV-2) is afforded by NaCl salting-out and then filtration.

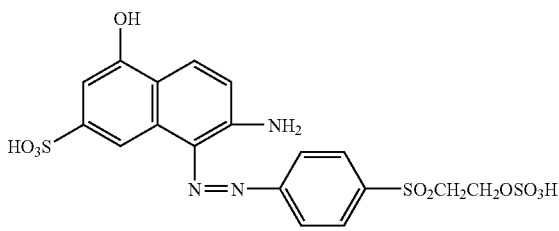

(2)

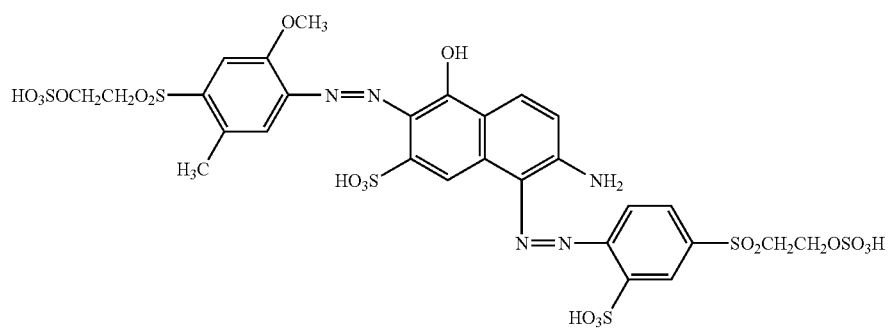

(IV-2)

PREPARATION EXAMPLE 3

28.1 parts of 1-aminobenzene-4-β-sulfatoethylsulfone is dissolved in 1000 parts of ice water, followed by the addition of 24 parts of 32% HCl aqueous solution and then 7.0 parts of sodium nitrite aqueous solution to perform diazotization in the temperature range of 0° C. to 5° C. Subsequently, 23.9 parts of 2-amino-5-hydroxy-naphthalene-7-sulfonic acid is added to the reaction solution to perform coupling reaction. Finally, the compound of the following formula (2) is afforded by NaCl salting-out and then filtration.

34.1 parts of 1-aminobenzene-2,5-dimethoxy-4-β-sulfatoethylsulfone is dissolved in 1000 parts of ice water, followed by the addition of 24 parts of 32% HCl aqueous solution and then 7.0 parts of sodium nitrite aqueous solution to perform diazotization in the temperature range of 0° C. to 5° C. Subsequently, the compound (2) afforded by the aforementioned coupling reaction is added therein, the pH value of the reaction solution is adjusted to 5~6 by sodium carbonate, and the coupling reaction is performed in the temperature range of 10° C. to 15° C. Finally, the compound of the following formula (IV-3) is afforded by NaCl salting-out and then filtration.

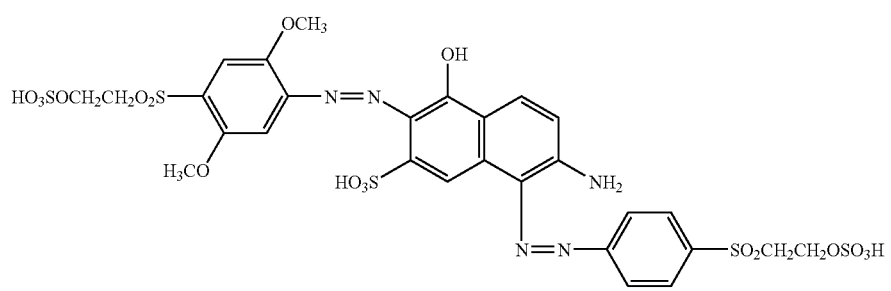

(IV-3)

PREPARATION EXAMPLE 4

36.1 parts of 1-aminobenzene-2-sulfonic acid-4-β-sulfatoethylsulfone is dissolved in 1000 parts of ice water, followed by the addition of 24 parts of 32% HCl aqueous solution and then 7.0 parts of sodium nitrite aqueous solution to perform diazotization in the temperature range of 0° C. to 5° C. Subsequently, 15.2 parts of 3,5-diaminobenzoic acid powder is added to the reaction solution to perform coupling reaction. Finally, the compound of the following formula (3) is afforded by NaCl salting-out and then filtration.

(3)

28.1 parts of 1-aminobenzene-4-β-sulfatoethylsulfone is dissolved in 200 parts of ice water, followed by the addition of 24 parts of 32% HCl aqueous solution and then 7.0 parts of sodium nitrite aqueous solution to perform diazotization in the temperature range of 0° C. to 5° C. Subsequently, the compound (3) afforded by the aforementioned coupling reaction is added therein, the pH value of the reaction solution is adjusted to 3.5~5.0 by sodium bicarbonate, and the coupling reaction is performed in the temperature range of 5° C. to 15° C. Finally, the compound of the following formula (II-1) is afforded by NaCl salting-out and then filtration.

solution and then 7.0 parts of sodium nitrite aqueous solution to perform diazotization in the temperature range of 0° C. to 5° C. Subsequently, the compound (3) afforded by the aforementioned coupling reaction is added therein, the pH value of the reaction solution is adjusted to 3.5~6.0 by sodium bicarbonate, and the coupling reaction is performed in the temperature range of 5° C. to 15° C. Finally, the compound of the following formula (II-5) is afforded by NaCl salting-out and then filtration.

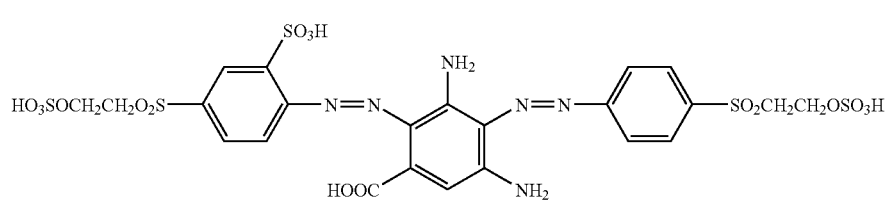

(II-1)

PREPARATION EXAMPLE 5

32.5 parts of 1-aminobenzene-2-methoxy-5-methyl-4-β-sulfatoethylsulfone is dissolved in 200 parts of ice water, followed by the addition of 24 parts of 32% HCl aqueous

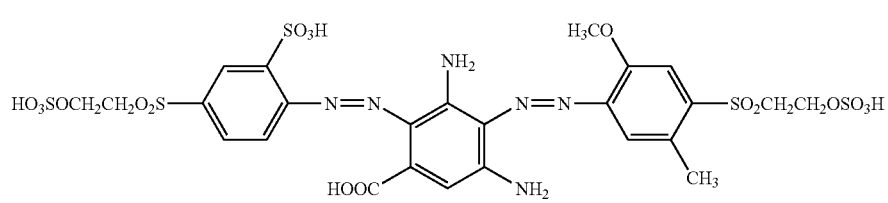
(II-5)

PREPARATION EXAMPLE 6

72.2 parts of 1-aminobenzene-2-sulfonic acid-4-β-sulfato-ethylsulfone is dissolved in 2000 parts of ice water, followed by the addition of 48 parts of 32% HCl aqueous solution and then 14.0 parts of sodium nitrite aqueous solution to perform diazotization in the temperature range of 0° C. to 5° C. Subsequently, 10.8 parts of phenylenediamine powder is added therein. The reaction solution is stirred for 3 hours, and then the pH value thereof is adjusted to 3.5~6.0 by sodium bicarbonate. The reaction solution is stirred in the temperature range of 5° C. to 15° C. to perform coupling reaction. Finally, the compound of the following formula (II-2) is afforded by NaCl salting-out and then filtration.

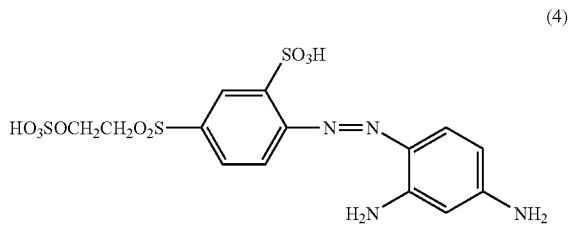
(4)

28.1 parts of 1-aminobenzene-4-β-sulfatoethylsulfone is dissolved in 200 parts of ice water, followed by the addition of

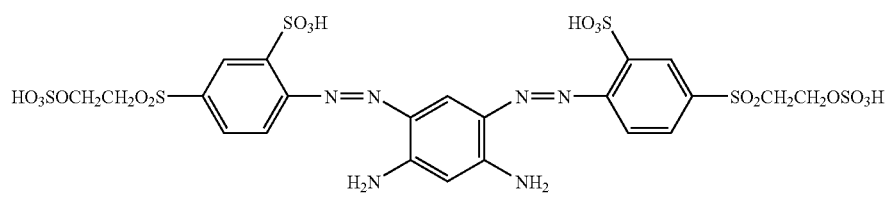
(II-2)

PREPARATION EXAMPLE 7

36.1 parts of 1-aminobenzene-2-sulfonic acid-4-β-sulfato-ethylsulfone is dissolved in 1000 parts of ice water, followed by the addition of 24 parts of 32% HCl aqueous solution and then 7.0 parts of sodium nitrite aqueous solution to perform diazotization in the temperature range of 0° C. to 5° C. Subsequently, 10.8 parts of phenylenediamine powder is added therein to perform coupling reaction so as to afford the compound of the following formula (4).

24 parts of 32% HCl aqueous solution and then 7.0 parts of sodium nitrite aqueous solution to perform diazotization in the temperature range of 0° C. to 5° C. Subsequently, the compound (4) afforded by the aforementioned coupling reaction is added therein, the pH value of the reaction solution is adjusted to 3.5~5.0 by sodium bicarbonate, and the coupling reaction is performed in the temperature of 5° C. to 15° C. Finally, the compound of the following formula (II-7) is afforded by NaCl salting-out and then filtration.

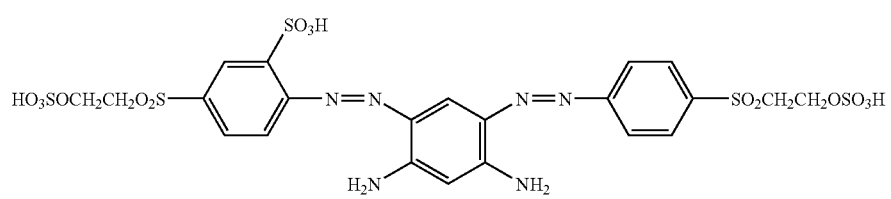
(II-7)

EXAMPLE 1

Preparation of Black Dye Composition 83.4 parts of (I-1) dye, 11.1 parts of (V-1) dye, and 5.5 parts of (III-1) dye are mixed, water is added to form 1000 parts of solution, and the pH value of the solution is adjusted to 4~6. Finally, a black dye composition is afforded by reverse osmosis salt exclusion and dryness.

EXAMPLE 2

Preparation of Black Dye Composition 44.4 parts of (I-1) dye, 39.0 parts of (I-4) dye, 11.1 parts of (V-1) dye, and 5.5 parts of (III-1) dye are mixed, water is added to form 1000 parts of solution, and the pH value of the solution is adjusted to 4~6. Finally, a black dye composition is afforded by reverse osmosis salt exclusion and dryness.

EXAMPLE 3~14

The black dye compositions of the present invention are prepared by repeating the steps of Example 1, but changing the components and the component ratio.

The components and the component ratio of the black dye compositions of Examples 3 to 8 are shown in the following Table 1. The components and the component ratio of the black dye compositions of Examples 9 to 14 are shown in the following Table 2.

TABLE 1

| | Component and Component Ratio | | | | |
|---|---|---|---|---|---|
| Example | (I-1) Dye | (I-4) Dye | (I-6) Dye | (V-1) Dye | (III-1) Dye |
| 3 | 44.4% | 0% | 39.0% | 11.1% | 5.5% |
| 4 | 55.5% | 27.9% | 0% | 11.1% | 5.5% |
| 5 | 55.5% | 0% | 27.9% | 11.1% | 5.5% |
| 6 | 27.7% | 55.7% | 0% | 11.1% | 5.5% |
| 7 | 27.7% | 0% | 55.7% | 11.1% | 5.5% |
| 8 | 44.4% | 16.6% | 22.4% | 11.1% | 5.5% |

TABLE 2

| | Component and Component Ratio | | | |
|---|---|---|---|---|
| Example | (I-1)Dye | (II-A)Dye | (II-B) Dye | (IV-1)Dye |
| 9 | 83.3% | 16.7% | 0% | 0% |
| 10 | 83.3% | 0% | 11.1% | 5.6% |
| 11 | 94.4% | 5.6% | 0% | 0% |
| 12 | 88.8% | 0% | 5.6% | 5.6% |
| 13 | 58.8% | 0% | 29.4% | 11.8% |
| 14 | 83.3% | 5.6% | 5.6% | 5.5% |

EXAMPLE 15

Preparation of Black Ink Composition (A) 18.0 parts of the black dye composition of Example 1; (B) 10.0 parts of 1,3-butanediol, and 5.0 parts of 2-pyrrolidone; (C) 0.5 parts of nonionic surfactant of Surfynol 465; and (D) 0.2 parts of microbicide of Proxel XL2 are mixed; and water is added to form 100 parts of solution. The solution is stirred at room temperature to afford the black ink composition.

EXAMPLE 16

Preparation of Black Ink Composition (A) 18.0 parts of the black dye composition of Example 2; (B) 10.0 parts of 1,3-butanediol, and 5.0 parts of 2-pyrrolidone; (C) 0.5 parts of nonionic surfactant of Surfynol 465; and (D) 0.2 parts of microbicide of Proxel XL2 are mixed; and water is added to form 100 parts of solution. The solution is stirred at room temperature to afford the black ink composition.

EXAMPLE 17

Preparation of Black Ink Composition (A) 18.0 parts of the black dye composition of Example 3; (B) 10.0 parts of 1,3-butanediol, and 5.0 parts of 2-pyrrolidone; (C) 0.5 parts of nonionic surfactant of Surfynol 465; and (D) 0.2 parts of microbicide of Proxel XL2 are mixed; and water is added to form 100 parts of solution. The solution is stirred at room temperature to afford the black ink composition.

EXAMPLE 18-28

The black ink compositions of the present invention are prepared by repeating the steps of Example 17, but changing the components and the component ratio.

The components and the component ratio of the black ink compositions of Examples 18 to 28 are shown in the following Table 3.

TABLE 3

| | Component and Component Ratio | | | | |
|---|---|---|---|---|---|
| | Component (A) 18 Parts of | Component (B) | | Component (C) Parts of | Component (D) Parts of |
| Example | Black Dye Composition | Parts of 1,3-butanediol | Parts of 2-pyrrolidone | Surfynol 465 | Proxel XL2 |
| 18 | Example 4 | 10 | 5 | 0.5 | 0.2 |
| 19 | Example 5 | 5 | 10 | 1 | 0.2 |
| 20 | Example 6 | 5 | 15 | 1.5 | 0.2 |
| 21 | Example 7 | 10 | 5 | 0.3 | 0.2 |
| 22 | Example 8 | 10 | 5 | 0.5 | 0.2 |
| 23 | Example 9 | 10 | 5 | 0.5 | 0.2 |
| 24 | Example 10 | 5 | 10 | 1 | 0.2 |
| 25 | Example 11 | 5 | 15 | 1.5 | 0.2 |
| 26 | Example 12 | 10 | 5 | 0.3 | 0.2 |
| 27 | Example 13 | 10 | 5 | 0.5 | 0.2 |
| 28 | Example 14 | 10 | 5 | 0.5 | 0.2 |

EXAMPLE 29-31

The black ink compositions of the present invention are prepared by repeating the steps of Example 15, but changing the component (B) and the component ratio thereof.

The components and the component ratio of the black ink compositions of Examples 29 to 31 are shown in the following Table 4.

TABLE 4

Component and Component Ratio

| | Component (A) | Component (B) | | | |
|---|---|---|---|---|---|
| Example | Black Dye Composition (18 parts) | Parts of 1,3-butanediol | Parts of 2-pyrrolidone | Parts of 2-methyl-2,4-pentanediol | Parts of 1,2-propanediol |
| 29 | Example 1 | 5 | 10 | 0 | 0 |
| 30 | Example 1 | 0 | 10 | 5 | 0 |
| 31 | Example 1 | 0 | 0 | 5 | 10 |

COMPARATIVE EXAMPLE 1

Preparation of Black Ink Composition 18.0 parts of Reactive Black 5, 10.0 parts of 1,3-butanediol, 5.0 parts of 2-pyrrolidone, 0.5 parts of nonionic surfactant of Surfynol 465, and 0.2 parts of microbicide of Proxel XL2 are mixed, and water is added to form 100 parts of solution. The solution is stirred at room temperature to afford the black ink composition.

COMPARATIVE EXAMPLE 2

Preparation of Black Ink Composition 18.0 parts of Reactive Black 8, 10.0 parts of 1,3-butanediol, 5.0 parts of 2-pyrrolidone, 0.5 parts of nonionic surfactant of Surfynol 465, and 0.2 parts of microbicide of Proxel XL2 are mixed, and water is added to form 100 parts of solution. The solution is stirred at room temperature to afford the black ink composition Test of Printing Preliminary Treatment Urea 100 parts, reduction retarding agent 10 parts, sodium bicarbonate 20 parts, sodium alginate 60 parts, and warm water 810 parts (1000 parts in total) are stirred in a vessel to give a completely homogeneous printing paste. The materials of the used fabric can be fibers or regenerated fibers. The fabric used in the Example is 3/1 twill. Before printing, the fabric is padded with the aforementioned printing paste (PICK-UP 70%) by a roller, and then dried by 100° C. steam.

Printing, Fixing, and Post Treatment

The fabric is printed by the nozzles of a piezo printer (Mimaki JV-22).

The black ink compositions of Example 15 to 31, Comparative Example 1, and Comparative Example 2 are individually installed in the piezo printer. The aforementioned fabric obtained by preliminary treatment is printed and then pre-dried in the condition of 50° C.×2 min, followed by fixation for 8~15 min by 102-110° C. saturated steam. Subsequently, the fabric is washed by 100° C. water and water containing washing reagent, and then dried.

Result of Dyeing Test:

The colored fabric obtained through the aforementioned process for printing with the ink composition of the example, wash with water, and then dryness exhibits the excellent dyeing properties, as shown in Table 5.

TABLE 5

Result of Dyeing Test

| Black Ink Composition | Solubility of Dyes | The Level of Chlorine-Resistant Fastness | Relative Color Depth |
|---|---|---|---|
| Example 15 | >150 g/L | 3-4 | 114% |
| Example 16 | >150 g/L | 3-4 | 110% |
| Example 17 | >150 g/L | 3-4 | 107% |
| Example 18~22 | >150 g/L | 3-4 | >105% |
| Example 23 | >150 g/L | 3-4 | 118% |
| Example 24 | >150 g/L | 4-5 | 115% |
| Example 25~28 | >150 g/L | 3-4 | >110% |
| Example 29~31 | >150 g/L | 3-4 | >110% |
| Comparative Example 1 | About 150 g/L | 2 | AS 100% |
| Comparative Example 2 | About 80 g/L | 3-4 | <80% |

According to Table 5, it is found that the black ink composition of the present invention exhibits the property of excellent solubility of dyes (>150 g/L), which is suitable for preparing a black ink composition with high concentration for textile digital printing. In addition, the level of chlorine-resistant fastness of the black ink composition is 1-2 higher than that of comparative example 1. Most importantly, the relative color depth of the black ink composition of the present invention is 10% higher than that of comparative example 1. In comparison to comparative example 2, the build-up of the black ink composition of the present invention is obviously better Please refer to FIG. 1. K/S curves of the black ink compositions of Example 15, Example 23, Example 24, and Comparative Example 1 are shown in FIG. 1. According to the K/S curves, it is found that the absorption of Comparative Example 1 at single wavelength is too high and the color is bluish (especially in grey-level), resulting in the pure black appearance cannot be achieved. Thereby, the black ink composition of Comparative Example 1 is not popular in market. The black ink compositions of Examples 15, 23, and 24 exhibit more full-range wavelength absorption and will be more darkness.

According to the results of various tests, the black ink composition obtained from the black dye composition of the present invention exhibits excellent properties of color depth and chlorine-resistant fastness in textile digital printing. The color gamut of the colored black fabric can be from greenishness to reddishness. Thereby, the color gamut of the digital printed black fabric is broad, and the build-up thereof is excellent.

Although the present invention has been explained in relation to its preferred embodiment, it is to be understood that many other possible modifications and variations can be made without departing from the scope of the invention as hereinafter claimed.

What is claimed is:

1. A black dye composition for textile digital printing, comprising:

(a) at least one azo dye of the following formula (I),

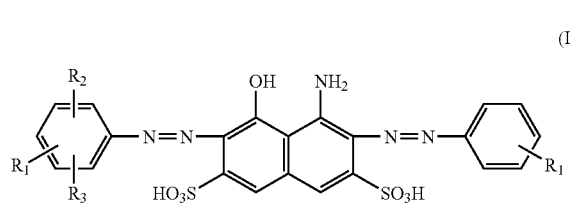
(I)

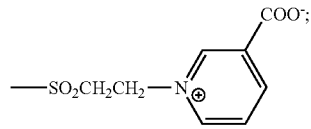

wherein $R_1$ is $-SO_2CH_2CH_2OSO_3H$, $-SO_2CH=CH_2$, or $R_2$ and $R_3$ each independently is $-CH_3$, $-OCH_3$, or H; and (b) at least one azo dye of the following formula (II),

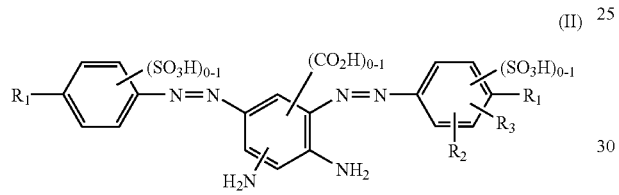
(II)

wherein $R_1$, $R_2$, and $R_3$ are defined as above, the content of the component (a) is 50~97% by weight, and the content of component (b) is 50~3% by weight.

2. The black dye composition as claimed in claim 1, further comprising:
(c) at least one azo dye of the following formula (IV)

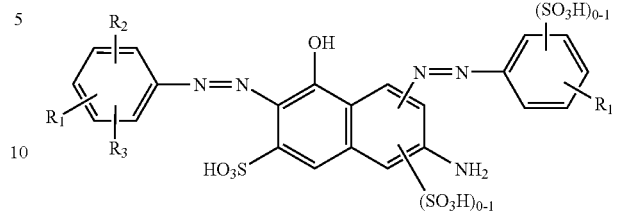
(IV)

wherein $R_1$, $R_2$, and $R_3$ are defined as claim 1, the content of component (a) is 50~94% by weight, the content of component (b) is 47~3% by weight, and the content of component (c) is 3~30% by weight.

3. The black dye composition as claimed in claim 1, wherein the azo dye of the formula (I) is the azo dye of the following formula (I-1),

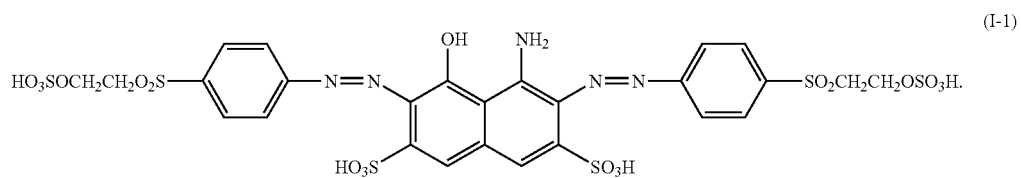
(I-1)

4. The black dye composition as claimed in claim 1, wherein the azo dye of the formula (II) is the azo dye of the following formula (II-A),

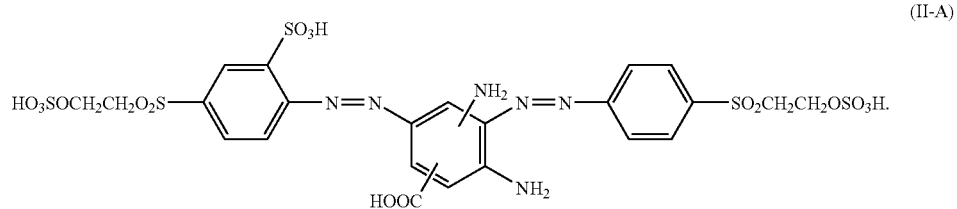
(II-A)

5. The black dye composition as claimed in claim 1, wherein the azo dye of the formula (II) is the azo dye of the following formula (II-B),

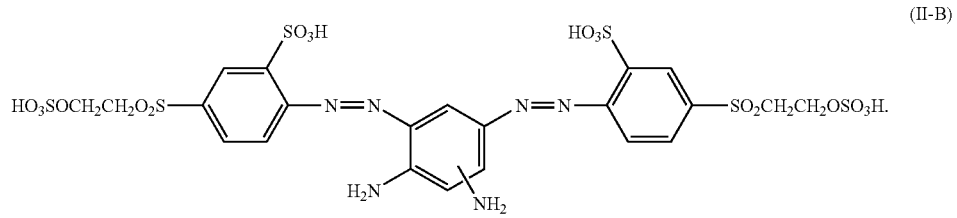
(II-B)

6. The black dye composition as claimed in claim 2, wherein the azo dye of the formula (I) is the azo dye of the following formula (I-1),

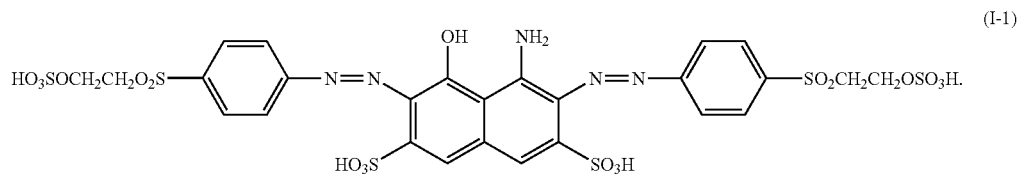
(I-1)

7. The black dye composition as claimed in claim 2, wherein the azo dye of the formula (II) is the azo dye of the following formula (II-A),

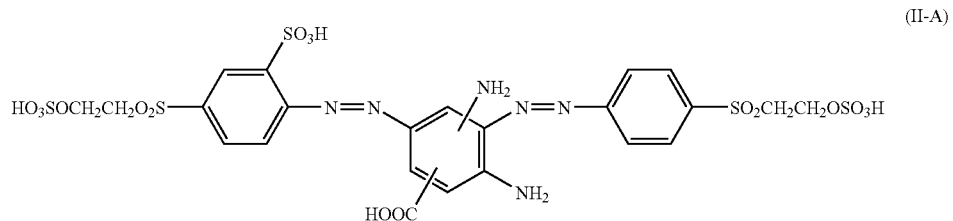
(II-A)

8. The black dye composition as claimed in claim 2, wherein the azo dye of the formula (II) is the azo dye of the following formula (II-B),

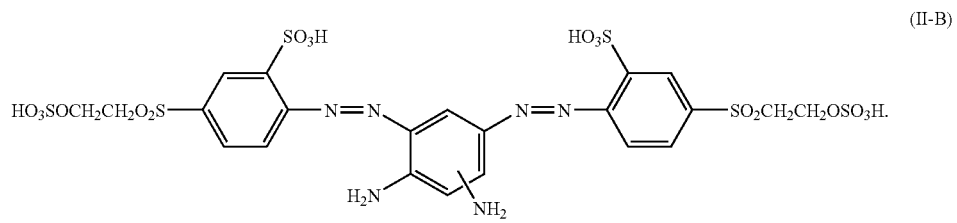
(II-B)

9. The black dye composition as claimed in claim 2, wherein the azo dye of the formula (IV) is the azo dye of the following formula (IV-1),

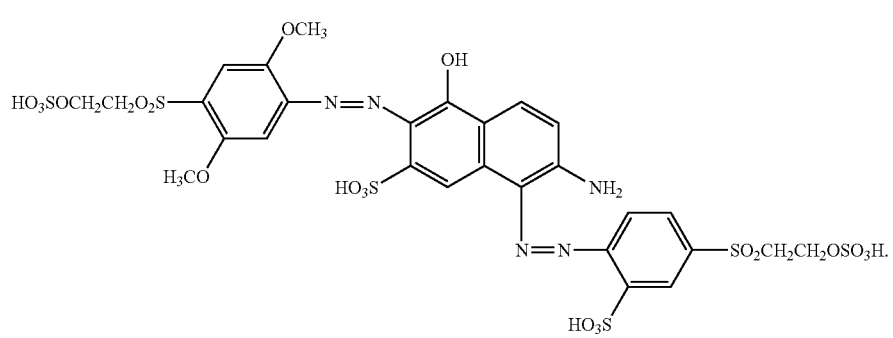
(IV-1)

10. The black dye composition as claimed in claim 1, wherein the azo dye of the formula (I) is the azo dye of the following formula (I-1),

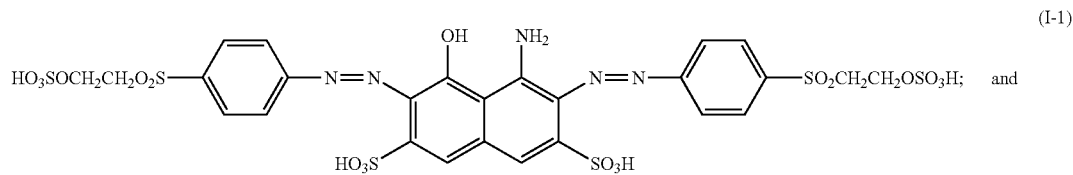
(I-1)

and the azo dye of the formula (II) is the azo dye of the following formula (II-A),

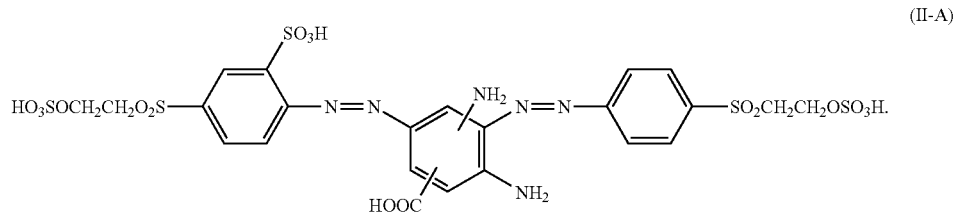
(II-A)

11. The black dye composition as claimed in claim 2, wherein the azo dye of the formula (I) is the azo dye of the following formula (I-1),

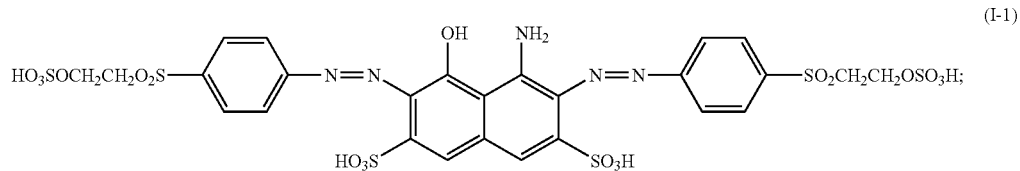
(I-1)

the azo dye of the formula (II) is the azo dye of the following formula (II-B),

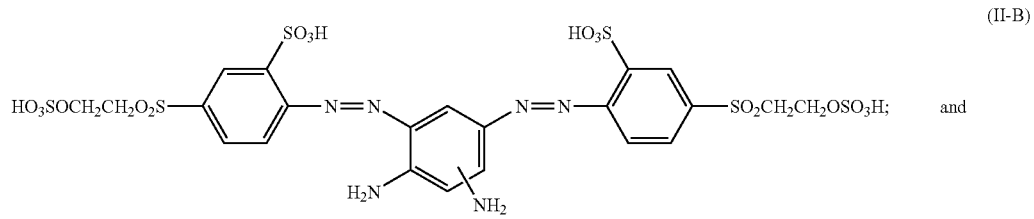

(II-B)

the azo dye of the formula (IV) is the azo dye of the following formula (IV-1),

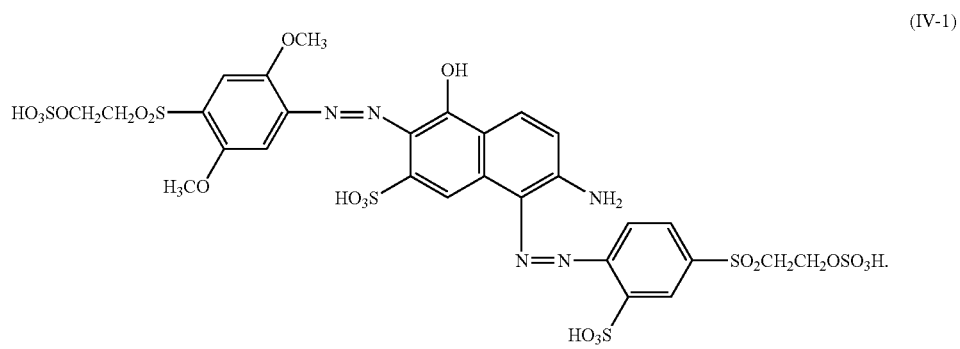

(IV-1)

12. A black ink composition for textile digital printing, comprising:
(A) 5~35% by weight of the black dye composition as claimed in claim 1; and
(B) 5~30% by weight of organic solvent selected from the group consisting of ethylene glycol, 1,3-butanediol, 2-methyl-2,4-pentanediol, 1,2-propanediol, 2-pyrrolidone, and N-methyl-2-pyrrolidone; and
90~35% by weight of water.

13. The black ink composition as claimed in claim 12, further comprising:
(C) 0.1~5% by weight of a surfactant of the following formula (VI),

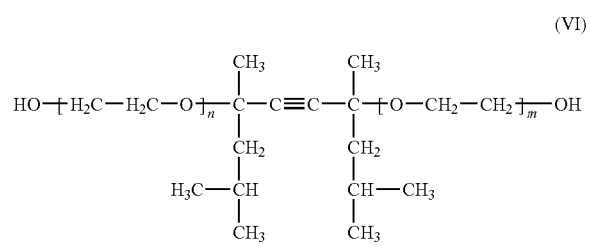

(VI)

wherein the sum of n and m is integer between 0 and 50.

14. A black ink composition for textile digital printing, comprising:
(A) 5~35% by weight of the black dye composition as claimed in claim 2; and
(B) 5~30% by weight of organic solvent selected from the group consisting of ethylene glycol, 1,3-butanediol, 2-methyl-2,4-pentanediol, 1,2-propanediol, 2-pyrrolidone, and N-methyl-2-pyrrolidone; and
90~35% by weight of water.

15. The black ink composition as claimed in claim 14, further comprising:
(C) 0.1~5% by weight of a surfactant of the following formula (VI),

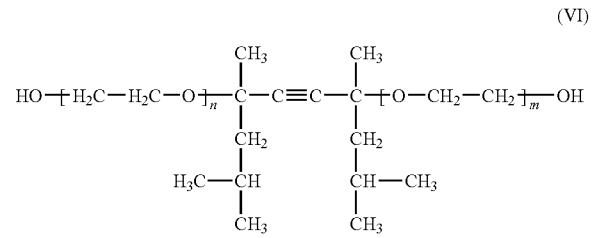

(VI)

wherein the sum of n and m is integer between 0 and 50.

* * * * *